United States Patent
Song (10) Patent No.: US 12,283,097 B1
(45) Date of Patent: Apr. 22, 2025

(54) METHOD FOR PREDICTING REMOTE SENSING IMAGE TIME SERIES BASED ON RESERVOIR COMPUTING

(71) Applicant: East China Jiaotong University, Nanchang (CN)

(72) Inventor: Lan Song, Nanchang (CN)

(73) Assignee: East China Jiaotong University, Nanchang (CN)

( * ) Notice: Subject to any disclaimer, the term of this patent is extended or adjusted under 35 U.S.C. 154(b) by 0 days.

(21) Appl. No.: 18/900,912

(22) Filed: Sep. 30, 2024

(30) Foreign Application Priority Data

Feb. 1, 2024 (CN) .......................... 202410144622.5

(51) Int. Cl.
*G06V 10/82* (2022.01)
*G06V 20/10* (2022.01)

(52) U.S. Cl.
CPC ............ *G06V 10/82* (2022.01); *G06V 20/188* (2022.01)

(58) Field of Classification Search
None
See application file for complete search history.

(56) References Cited

U.S. PATENT DOCUMENTS

2022/0050995 A1 * 2/2022 Laszlo ................ G06F 18/2163
2022/0186451 A1 * 6/2022 Zhang ..................... G06F 30/28

* cited by examiner

*Primary Examiner* — Leon Flores (57) ABSTRACT

A method for predicting remote sensing image time series based on reservoir computing utilizes temporal spectral information of remote sensing images to study prediction methods for high-dimensional short-term sequences. Based on the theoretical model of a nonlinear dynamical system and using the spatiotemporal transformation equation and its conjugate equation, a multi-layer reservoir computing model is constructed to achieve multi-step prediction on a time dimension. Only a small number of short-term samples are required to predict dynamic temporal information. Compared with the traditional neural network training process, the method is low-cost training. Different from traditional reservoir computing, the method converts the observed high-dimensional data into reservoir computing and uses intrinsic dynamics of the observation/target system to analyze remote sensing time series data. With only a few samples, by learning the spatiotemporal transformation equation, effective prediction results can be generated and applied to feature processing of remote sensing images with small samples.

4 Claims, 5 Drawing Sheets

METHOD FOR PREDICTING REMOTE SENSING IMAGE TIME SERIES BASED ON RESERVOIR COMPUTING

CROSS-REFERENCE TO RELATED APPLICATION

This application claims priority to Chinese Patent Application No. 202410144622.5, filed Feb. 1, 2024, which is herein incorporated by reference in its entirety.

TECHNICAL FIELD

The disclosure relates to the field of remote sensing technologies, and particularly to a method for predicting remote sensing image time series based on reservoir computing.

BACKGROUND

In addition to spatial and spectral information, remote sensing images also have temporal attributes. Temporal information of the remote sensing images is often used to monitor indicators such as growth cycle of crops, vegetation coverage, and weather changes. Deep learning methods, as a 'data-driven' technology, play an important role in change detection of the remote sensing images based on time series. When remote sensing data appears in a form of time series, recurrent neural networks (RNNs) are often used to train the models to be learned. The difference between feedforward neural networks and the RNNs lies in a type of task. The feedforward neural networks are mainly used for processing static (non-temporal) data, and individual data are processed independently even if given in order, such as object-based remote sensing image classification. This is because individual input images are independent, so there is no need to capture a correlation between the input images. The RNNs are more suitable for dynamic (temporal) data processing, and recursive connections allow the network to capture temporal features in continuous input data, embedding the time dependency of the input data into its dynamic behavior. Reference[1] studied the features of hyperspectral data, analyzing the hyperspectral data from a sequential perspective for high-dimensional input vectors of hyperspectral image samples, treating each hyperspectral pixel as a data sequence, and modeling it through RNNs to find dependency relationships between target pixels in different bands. Reference[1] proposed a convolutional recurrent neural network (CRNN), as convolutional operations are more suitable for modeling local dependencies, convolution is used to extract intermediate and local invariant features from the input data. Since the RNNs are more suitable for modeling sequence dependencies, recurrent layers are used to extract spectral dependency relationships from the intermediate features generated by the convolutional layers. Although the recurrent connections in RNNs are useful for processing the temporal dynamics of input signals in RNNs, the computation of errors uses a chain rule to calculate gradients, and the current state depends not only on the current input but also on previous states and inputs. These operations increase the computational cost of training the network.

A long short-term memory network (LSTM), evolved from the RNNs, is capable of nonlinear prediction of time series data and is suitable for processing and predicting problems in time series that involve long-distance dependencies[2]. An artificial neural network (ANN) is a nonlinear prediction tool commonly used for time series prediction with chaotic characteristics[3]. An autoregressive integrated moving average model (ARIMA) is a model for capturing temporal structures in time series data[4]. However, it is difficult to model the nonlinear relationships between variables using the ARIMA alone. The ARIMA-ANN model integrates advantages of the ARIMA and the ANN, enabling the modeling of both linear and nonlinear behaviors in datasets[5].

In the anatomical research of neurophysiology on the cortical and corticostriatal systems of primates in the 1980s, researchers found a large number of extremely short-distance, local, and recurrent connections between pyramidal cells and inhibitory interneurons. During the process of training and learning, the neurons in the corticostriatal system of monkeys have spatial features that are arranged in sequence. Barone and Joseph et al.[6] found that half of the 300 brain cells of the studied primates showed a complex combination of spatial and temporal dimensions of the task. Reservoir computing[7] (RC) emerged from this research in behavioral neurophysiology. The RC is a computational framework suitable for time data or sequence data processing and is easy to implement in hardware. It derived from recurrent network models such as echo state networks (ESN) and liquid state machines (LSM). The difference between these methods and the traditional RNNs is that there is no need to train weights of an input layer and a hidden layer in the RC, and these weights are fixed, only the weights of a readout layer are trained. The RC meets the needs of low training cost and real-time processing. Among them, the ESN is more commonly used in the RC. The ESN is based on discrete neurons to form a reservoir pool, and linear regression or simple machine learning methods are often used to solve problems during the computation. The LSM is often used in RC frameworks related to biological learning, and the computation is often solved by perceptron local methods or asymmetric synapse methods. Although the RC is suitable for temporal pattern recognition, it can be applied to image recognition by converting images into sequences of pixel values.

In high-dimensional nonlinear dynamical systems, a transient phase includes variables that are highly intercorrelated at higher orders, and a subsequent stable dynamic phase includes lower-order variables related to time. In time series analysis, after obtaining a large amount of low-dimensional time series data, there are significant difficulties in predicting short-term sample data during the reconstruction or prediction process of the system. This is because the short-time samples are often not complete and cannot reflect statistical laws of the dynamical behavior of the system. Reference[8] studied a framework for predicting a future state of nonlinear dynamical systems, named randomly distributed embedding (RDE). It can achieve short-term future state prediction of the high-dimensional data. The RDE randomly generates a sufficient number of "non-delay embeddings" and maps each of them to a "delay embedding". These low-dimensional delay attractors and high-dimensional non-delay attractors preserve the dynamic information of the entire system in different ways. According to the "differential homeomorphism mapping" principle in embedding theory, the reconstructed high-dimensional non-delay attractor and the low-dimensional delay attractor have a conjugate relationship with an original attractor. By statistically predicting the distribution of multiple delay embeddings, accurate predictions of future states can be obtained. Reference[9] proposed an auto-reservoir neural network (ARNN) that achieves multi-step prediction of short-term high-dimensional temporal data, mapping high-dimensional spatial data onto the future temporal values of the target variable through spatiotemporal information (STI) transformation.

In predicting time series data, when the dataset has the properties of being short-term and high-dimensional variables, the prediction is somewhat challenging. On the one hand, there are fewer statistical models that can predict short-term data. When the nearest sequence in historical data is used to predict future values, the short-term data is sparsely represented in high-dimensional space, which may lead to the problem of erroneous nearest neighbors[10]. On the other hand, the high-dimensional variables can easily lead to large computational dimensions, when gradient descent algorithms are used to fit the weights in neural networks, it will consume a significant amount of computational time.

SUMMARY

In response to the shortcomings in the related art, the disclosure provides a method for predicting remote sensing image time series based on reservoir computing.

To achieve above purpose, the technical solutions of the disclosure are as follows.

A method for predicting remote sensing image time series based on reservoir computing includes a reservoir computing network, and the reservoir computing network includes an input layer, a reservoir, and an output layer.

An observation vector s(t) inputted at a time point t is projected onto a randomly generated high-dimensional subspace V(S) through the reservoir, where V represents the high-dimensional subspace and S represents input time vectors. A predicted target is represented by a low-dimensional subspace as follows:

$$V'(\tilde{y}) = \{y_{h+1}, y_{h+2}, \ldots, y_{h+L-1}\}$$

where V' represents the low-dimensional subspace, y represents the predicted target, h represents a length of observational data in a temporal dimension, y={$y_{h+1}$, $y_{h+2}$, ..., $y_{h+L-1}$} represents target information, Y is a matrix form of the target information y, including real target information {$y_1$, $y_2$, ..., $y_h$} and target information to be predicted {$y_{h+1}$, $y_{h+2}$, ..., $y_{h+L-1}$}, and Y is expressed as follows:

$$Y = \begin{Bmatrix} y_1, y_2, \ldots, y_h \\ y_2, y_3, \ldots, y_{h+1} \\ \vdots & \vdots \\ y_L, y_{L+1}, \ldots, y_{h+L-1} \end{Bmatrix}$$

The reservoir includes hidden layers, and a number of the hidden layers is N. h numbers of N-dimensional observation vectors are sequentially input into the hidden layers ($RC_1$, $RC_2$, ... $RC_n$) of the reservoir to compute, and the h numbers of N-dimensional observation vectors are expressed as a matrix as follows:

$$S \Rightarrow \begin{Bmatrix} s_1 \\ s_2 \\ \vdots \\ s_N \end{Bmatrix} \Rightarrow \begin{Bmatrix} s_1^1, s_1^2, \ldots, s_1^h \\ s_2^1, s_2^2, \ldots, s_2^h \\ \vdots & \vdots \\ s_N^1, s_N^2, \ldots, s_N^h \end{Bmatrix}$$

Numbers of neurons in the hidden layers of the reservoir are ($N_{r1}$, $N_{r2}$, ..., $N_{rN}$), a weight matrix of each hidden layer is randomly generated and is expressed as W, and $N_{rl}$ represents the number of neurons in a l-th hidden layer of the reservoir. $s(t) \in \mathbb{R}^N$ is input into a first hidden layer of the reservoir, thereby obtaining an input weight matrix of the first hidden layer as $W_{In} \in \mathbb{R}^{N_{r1} \times N_z}$, and obtaining a weight matrix of the l-th hidden layer of the reservoir as $W_{res_l} \in \mathbb{R}^{N_{rl} \times N_{rl(l-1)}}$. $W_{res_l}$ and $W_{In}$ are fixed values in the reservoir, and the weight matrix of each hidden layer in the reservoir is expressed as follows:

$$RC_1$$
$$\begin{bmatrix} r_1^1, r_1^2, \ldots, r_1^n \\ r_2^1, r_2^2, \ldots, r_2^n \\ \vdots \\ r_{U_{r1}}^1, r_{U_{r1}}^2, \ldots, r_{U_{r1}}^n \end{bmatrix}$$

$$RC_2 \qquad\qquad RC_N$$
$$\begin{bmatrix} r_1^1, r_1^2, \ldots, r_1^{U_{r1}} \\ r_2^1, r_2^2, \ldots, r_2^{U_{r1}} \\ \vdots \\ r_{U_{r2}}^1, r_{U_{r2}}^2, \ldots, r_{U_{r2}}^{U_{r1}} \end{bmatrix} \ldots \begin{bmatrix} r_1^1, r_1^2, \ldots, r_1^{U_{rN-1}} \\ r_2^1, r_2^2, \ldots, r_2^{U_{rN-1}} \\ \vdots \\ r_{U_{rN}}^1, r_{U_{rN}}^2, \ldots, r_{U_{rN}}^{U_{rN-1}} \end{bmatrix}$$

The observation vector s(t) varying over time evolves on an m-dimensional manifold M according to a dynamic $F_s(s(t))$, where $M \subset \mathbb{R}^m$, $F_s: M \to \mathbb{R}^m$ represents a smooth vector field. An observation function is defined as $v: M \to \mathbb{R}$, representing a discrete observation sequence v[s(t)], where t=0, 1, 2, ..., T represents sampling instances, a propagation mapping function $\phi: M \to M$ represents a flow of s(t) at the time point t, and $s(t) = \phi(s(t))$.

According to Takens theorem, there is a mapping $\Phi_{\phi,v,2m+1}(s(t)) = (v(s(t)), v(p(s(t))), \ldots, v(\phi^{2m}(s(t))))$, where 2m+1 represents a length of time delay embedding $\Phi_{\phi,v,2m+1}(s(t))$; for a pair ($\phi$,v) defined on the m-dimensional manifold M, where $v: M \to \mathbb{R}$ and $\phi: M \to M$, there is a one-to-one correspondence from M to $\Phi_{\phi,v,2m+1}(s(t))$, that is, $\Psi_{\phi,v,2m+1} = \Phi_{\phi,v,2m+1} \circ \phi \circ \Phi_{\phi,v,2m+1}^{-1}$, where $\circ$ represents a function composition operation, and the formula describes a dynamical system under low-dimensional delayed coordinates that is identical to $\phi$. A one-step prediction of a delayed attractor is performed by using a non-delayed attractor, when delayed observation values $v(s(t))$, $v(\phi(s(t)))$, ..., $v(\phi^{2m}(s(t)))$, are provided, using $\Psi_{\phi,v,2m+1}$ to predict a new value: $\Phi_{\phi,v,2m+1}(v(s(t)), v(\phi(s(t))), \ldots, v(\phi^{2m}(s(t)))) = (v(\phi(s(t))), \ldots, v(\phi^{2m}(s(t))), v(\phi^{2m+1}(s(t))))$.

An output of the hidden layers of the reservoir is denotated as $F_{RC}(s(t))$, the mapping $\Phi_{\phi,v,2m+1}$ is denotated as $\Phi$, according to an embedding theorem, $\Phi(F_{RC}(s(t)))$ represents as an output sequence $Y^t$, $Y^t$ represents temporal information of a target variable. Since the embedding is a one-to-one mapping, a conjugate form of $\Phi$ is $\Psi_{\phi,v,2m+1}$, abbreviated as $\Psi$, hence $F_{RC}(s(t)) = \Psi(Y^t)$, $\Phi: \mathbb{R}^D \to \mathbb{R}^L$, $\Psi: \mathbb{R}^L \to \mathbb{R}^D$ where L represents an embedding dimension.

After linearizing spatiotemporal information (STI), formulas (6) and (7) are obtained as follows:

$$AF_{RC}(s(t)) = Y^t \qquad (6)$$

$$F_{RC}(s(t)) = BY^t \qquad (7)$$

where AB=I, a dimension of A is L×D, and a dimension of B is D×L.

After passing through the reservoir, the observation vector s(t) is projected from an N-dimensional space onto a D-dimensional space. a weight matrix $B \in \mathbb{R}^{D \times L}$ is initialized as a zero matrix, and then fitting of training data is performed by using a formula of $F_{RC}(s(t)) = BY$ as follows:

$$[y_1,\ldots,y_h] \Rightarrow \begin{bmatrix} y_1, y_2, \ldots, y_L \\ y_2, y_3, \ldots, y_{L+1} \\ \vdots \\ y_{h-L}, \ldots, y_h \end{bmatrix} \begin{bmatrix} y_1, y_2, \ldots, y_L \\ y_2, y_3, \ldots, y_{L+1} \\ \vdots \\ y_{h-L}, \ldots, y_h \end{bmatrix} \begin{bmatrix} B_{i,1} \\ B_{i,2} \\ \vdots \\ B_{i,L} \end{bmatrix} = \begin{bmatrix} r_1^i \\ r_2^i \\ \vdots \\ r_{h-L}^i \end{bmatrix}$$

where i=1, ..., D.

Ultimately, the weight matrix B is formed by vertically concatenating a transpose of $$\begin{bmatrix} B_{i,1} \\ B_{i,2} \\ \vdots \\ B_{i,L} \end{bmatrix}.$$

The weights are linearly updated row by row during each iteration as follows:

$$B_{i,j} = \frac{1}{\text{item}} \sum_{\zeta=1}^{\text{item}} w_\zeta B_{i,j}$$

where item represents a number of iterations, and $w_\zeta$ represents a weight coefficient at each iteration.

An objective function is a root mean square error function as follows:

$$\min RMSE = \sqrt{\sum_{i=1}^{L} \frac{(\hat{y}_i - y_i)^2}{L}}$$

where $\hat{y}_i$ represents a predicted value and $y_i$ represents a real value.

A final prediction result is calculated by the following formula: $AF_{RC}(s(t))=Y$.

In an embodiment, a leak rate of $W_{res_l}$ is set to 1%-5%.

In an embodiment, $J_{ij}$ is represented as a connection weight matrix between neurons within the reservoir. A spectral radius of the connection weight matrix is set to meet a condition of being close to but less than 1, thereby making the reservoir to operate stably. and the following formula is used for updates in order to achieve a stable state of the reservoir:

$$J_{ij} = \frac{\rho(J_{ij}^0) J_{ij}^0}{|\lambda_{max}(J_{ij}^0)|}$$

where $\rho(J_{ij}^0)$ represents a spectral radius of a randomly generated connection matrix $J_{ij}^0$, and $\lambda_{max}$ represents a largest eigenvalue of $J_{ij}^0$.

The beneficial effects of the disclosure are as follows: the disclosure utilizes reservoir computing and spatiotemporal transformation theory to propose a novel reservoir computing method. By utilizing the temporal-spectral information of remote sensing images, it studies the prediction method for high-dimensional short-term sequences, and constructs a multi-layer reservoir computing model based on the spatiotemporal transformation equation and its conjugate equation on the basis of the nonlinear dynamic system theoretical model, which can achieve multi-step prediction on a time dimension. Only a small number of short-term samples are required as input to predict dynamic temporal information.

Compared to the traditional neural network training process, the method of the disclosure is a low-cost training. Unlike traditional reservoir computing, the method of the disclosure converts the observed high-dimensional data into reservoir computing and analyzes remote sensing time series data using the intrinsic dynamics of the observation or target system.

With only a small number of samples, it can effectively produce the predicted results of the target by learning the spatiotemporal transformation equations, and can be applied to the feature processing of remote sensing images with small samples.

The proposed method can effectively capture complex spatiotemporal dynamic characteristics, thereby improving prediction accuracy. In particular, integrating multi-source data, such as weather, topography, and soil information, provides more comprehensive contextual information for prediction models, helping to identify interactions and impacts between various factors. The integrating multi-source data outlined here is not only applicable to crop yield prediction and forest cover change monitoring in agriculture and forestry but also plays a key role in climate change modeling and environmental monitoring, such as tracking pollution sources and assessing ecosystem health.

DETAILED DESCRIPTION OF EMBODIMENTS

The disclosure will be further described in conjunction with the attached drawings. It should be noted that embodiments are based on this technical solution and provides detailed implementation methods and specific operation processes. However, the scope of protection of the disclosure is not limited to the embodiments.

The disclosure provides a method for predicting remote sensing image time series based on reservoir computing.

I. Reservoir Computing

Reservoir computing (RC) is a neural network-based framework that holds great potential for enabling efficient learning in neural networks[11]. A reservoir consists of multiple neurons with recurrent connections, mapping the input signals into a high-dimensional space.

The reservoir computing architecture is composed of three components: an input layer feeding observed data into the network, an output layer that weights the network's state, and a pool of interconnected neurons, i.e., the reservoir. The reservoir is a hidden neural network with recurrent connections, is a dynamic recursive layer containing a large number of sparsely connected nonlinear nodes, and is a nonlinear dynamical system driven by the input sequence {s(t)}.

A set of two sequences is provided Dataset={s(t), y(t)}$_{t=1}^{T}$, where s(t) and y(t) are a one-dimensional input signal and a one-dimensional output signal, respectively, at time point t. Dataset is training data. The reservoir computing studies a relationship between s(t) and y(t) from the training data Dataset. After a training period t>T, for a given new input data s(t), an estimate ŷ(t) is provided to predict an unknown output y(t). For an input time series data {s(i)}$_{i \le t}$, a goal of the reservoir computing is to predict s(t+τ), that is, y(t)=s(t+τ), thereby to achieve τ-step ahead prediction.

In the reservoir computing, connection weights between the input layer and the reservoir, as well as the internal connection weights within the reservoir, are pre-fixed (e.g., randomly) rather than trained[12]. The only thing that needs to be trained in the reservoir computing is the connection weights between the reservoir and the output layer, which greatly reduces the computational load generated by network training.

A time is set to be t (=1, 2, . . . ), and $r_i(t)$ is set to be a state of an i-th neuron node (i=1, . . . , n) in the reservoir at the time t, where n is a total number of neuron nodes in the reservoir. The state of the reservoir evolves over time is shown in the following formula (1):

$$r_i(t) = \phi\left[\sum_{j=1}^{n} J_{ij}r_j(t-1) + v_i s(t)\right] \quad (1)$$

where $\phi[\cdot]$ represents an activation function, typically using $\varphi[u]=\tanh g(u)$, where $g \in \mathbb{R}$ represents a parameter and u represents the input data; $v_i$ represents a connection weight vector between the reservoir and the input layer, and $J_{ij}$ represents a connection weight matrix between the neuron nodes within the reservoir, i,j=1, . . . , n. The values of $v_i$ and $J_{ij}$ are fixed once they are determined by initial random numbers, and only the connection weight vector $\{w_i\}_{i=1}^{n}$ between the reservoir and the output layer needs to be trained. The output layer is a linear readout, which can be solved by solving a convex optimization problem.

A predicted output y(t) is obtained by weighting a sum of the reservoir states, as shown in the following formula (2):

$$\hat{y}(t) = \sum_{i=1}^{n} w_i r_i(t) \quad (2)$$

The training of the connection weight vector between the reservoir and the output layer is learned through the least squares. $y=(y(1), \ldots, y(t))^T$ represents a sequence of actual outputs. T represents a transpose, $w=(w_1, \ldots, w_n)^T$ represents the connection weight vector between the reservoir and the output layer, and $r_i(t)$ is represented by the matrix $\Phi_{ti}$, then the formula (2) can be represented as $\hat{y}=\Phi w$.

According to a condition of minimizing the squared error $E(w)=\|y-\hat{y}\|^2$, where ŷ represents a predicted output and y represents an actual output, $\|\cdot\|$ represents a L2-norm, thereby to obtain a system of equations $\partial_{w_i}E(w)=0$ (i=1, . . . , n) and its solution $w=(\Phi^T\Phi)^{-1}\Phi^T y$.

An inverse matrix of $\Phi^T\Phi$ is needed to calculate, which is of size n×n, where n is the number of nodes.

To ensure that ŷ(t) closely approximates s(t), after the training is completed, a future evolution of the input s(t) for t>0 is predicted by replacing the input s(t) with ŷ(t).

II. The Delay Embedding of a Nonlinear Dynamical System

The pattern of state changes over time reflects dynamic characteristics of a dynamical system. This change process can be represented in phase space, where each point in phase space represents a possible state of the dynamical system. All aspects of the dynamical system at a given moment are concentrated at a single point, and the evolution of the dynamical system is represented by movement of points in phase space. As the dynamical system evolves over time, the point will trace out a trajectory in the phase space. If time is continuous, the trajectory is referred to as a flow; if the time is discrete, it is referred to as a map. The phase space provides a method for transforming numbers into images, thus facilitating the observation of evolutionary patterns of the dynamical system in research.

For a time-dissipative system where the state depends only on recent past inputs, their properties indicate that a current state is independent of more distant past inputs. That is, an influence of the past inputs on the current state and outputs gradually diminishes, which is an echo state property. An attractor in the time-dissipative system expresses an ultimate convergence type of a long-term evolution of the dissipative system, which can be represented geometrically as the pattern of point movement in the phase space[13].

The variable s(t) changing over time evolves on an m-dimensional manifold M ($M \subset \mathbb{R}^m$) according to a dynamics $F_s(s(t))$, where $F_s:M \to \mathbb{R}^m$ represents a smooth vector field. Let $v:M \to \mathbb{R}$ represent an observation function, and denoting as a discrete observation sequence v[s(t)], where t=0,1,2, . . . , T represents sampling instances; a propagation mapping function $\phi:M \to M$ represents a flow of s(t) at the time point t, and $s(t)=\phi(s(t))$.

According to Takens theorem, there is a mapping: $\Phi_{\phi,v,2m+1}(s(t))$ (v(s(t)), v($\phi$(s(t))), . . . , v$\phi$p$^{2m}$(s(t)))), where 2m+1 represents a length of the time delay embedding $\Phi_{\phi,v,2m+1}(s(t))$. For a pair ($\phi$,v) defined on the m-dimensional manifold M, where $v:M \to \mathbb{R}$ and $\phi:M \to M$, there is a one-to-one correspondence from M to $\Phi_{\phi,v,2m+1}(s(t))$, that is, $\Psi_{\phi,v,2m+1}=\Phi_{\phi,v,2m+1} \circ \phi \circ \Phi_{\phi,v,2m+1}^{-1}$, where $\circ$ represents a function composition operation, this formula represents a dynamical system under low-dimensional delayed coordinates that is identical to $\phi$. A one-step prediction of a delayed attractor by using a non-delayed attractor is performed, when delayed observation values v(s(t)), v($\phi$(s(t))), . . . , v(($\phi^m$(s(t))) are provided, $\Psi_{\phi,v,2m+1}$ is used to predict a new value $\Phi_{\phi,v,2m+1}$(v(s(t)), v((($s(t))), . . . , v($\phi^{2m}$(s(t)))) v($\phi$(s(t))), . . . , v(($\phi^{2m}$(s(t))), v(($\phi^{2m+1}$(s(t)))).

When using the method of coordinate delays, a delay time and an embedding dimension for reconstructing the phase space are unrelated, and a mutual information function method is often used to determine the delay time[15]. Suppose there are two discrete variables S representing the time series s(t) and Q representing the delayed time s(t+τ).

The mutual information is calculated by the following formula (3):

$$I(S,Q)=(H(S)+H(Q)-H(S,Q)) \quad (3)$$

where I(S,Q) represents a degree of certainty in predicting s(t+τ) by given s(t). If I(S,Q) is 0, it indicates that the prediction is not possible at all. H(S) and H(Q) represent information entropy of the discrete variable S and information entropy of the discrete variable Q, respectively, H(S,Q) represents a joint entropy of the variables S and Q. $p_S(i)$ is a probability of the variable S being in state i, $p_Q(j)$ is a probability of the variable Q appearing in state j, and $p_{S,Q}(i,j)$ is a probability of the variable S being in the state i and the variable Q being in the state j simultaneously.

Takens theorem states that when the embedding dimension is greater than twice the fractal dimension of the attractor, it is possible to find a suitable embedding dimension that allows for the prediction of a new delayed variable based on the observed variable. However, this condition is sufficient but not necessary. When using real measured data for delay prediction, other methods are usually employed to determine the embedding dimension[16,17]. A common strategy in practical environments is to select the delay time τ and then gradually increase m, choosing the embedding dimension m for reconstructing the phase space when the geometric invariants of the attractor (such as the correlation dimension, etc.) tend to stabilize.

III. Application of Takens Theorem in Reservoir Calculation

In reservoir computing, the state sequence contains all the information required to reconstruct the phase space, which in turn can generate the entire evolution process of the dynamical system on the observed data.

An n-dimensional time series data $r_i(t)$, i=1,2, ..., n is used to reconstruct two types of attractors: a high-dimensional non-delay attractor and a low-dimensional delay attractor. According to embedding theory, the low-dimensional delay attractor and the high-dimensional non-delay attractor preserve the dynamic information of the entire system in different ways[14]. In the delay attractor, single-variable time information can be utilized, while in the non-delay attractor, spatial interdependencies between high-dimensional variables can be leveraged. Combining the two types of information enables the prediction of dynamic temporal information.

The high-dimensional non-delay attractor $\mathcal{N}$ is expressed as follows:

$$\mathcal{N} = (r_1(t), r_2(t), \ldots r_i(t), \ldots, r_n(t)) \quad (4)$$

where i represents the dimension of spatial information of time series variables.

The low-dimensional delay attractor $\mathcal{M}$ is expressed as follows:

$$\mathcal{M}_{(r_k(t), r_k(t+\tau), r_k(t+2\tau), \ldots)} \quad (5)$$

where t represents the time at a certain moment, i represents a time interval, and all adjacent two delayed variables have equal time intervals. $r_k(t)$ is a state of a single variable observed at time t, k=1, ..., n.

Due to the differential homeomorphism, these two types of attractors are topologically conjugate to the original attractor, hence, there exists a mapping: $\mathcal{N} \to \mathcal{M}$, meaning that there is a one-to-one smooth mapping between the non-delay attractor and the delay attractor.

The randomly distributed embeddings (RDE) framework leverages the conjugate property and proposes a multivariate prediction method. It sequentially calculates the predictor $\psi_1$ for each tuple and a predicted value $\tilde{s}_k^i(t^*+\tau)$ at a future time $t^*+\tau$ obtained from the predictor. The multiple sets of predicted values form a distribution, which reflects the properties of the dynamical system. The final prediction result is obtained by estimating the expectation or aggregation of the distribution. The computation of the predictor uses Gaussian process regression, and the fitting of the distribution of a set of predicted values employs kernel density estimation methods.

The method of the embodiment uses the training process of reservoir computing to replace the fitting and aggregation computation process in the RDE framework. Experimental results can prove that the method of the embodiment is equally applicable to short-term data prediction as the RDE framework.

An output of the hidden layers of the reservoir is repressed as $F_{RC}(s(t))$. Let a mapping $\Phi_{\phi,v,2m+1}$ be represented by a symbol $\Phi$, according to an embedding theorem, $\Phi(F_{RC}(s(t)))$ is represented as an output sequence $Y^t$, $Y^t$ represents temporal information of a target variable. Since the embedding is a one-to-one mapping, a conjugate form of $\Phi$ is $\Psi_{\phi,v,2m+1}$, abbreviated as $\Psi$, hence $F_{RC}(s(t))=\Psi(Y^t)$, $\Phi: \mathbb{R}^D \to \mathbb{R}^L$, $\Psi: \mathbb{R}^L \to \mathbb{R}^D$ and L represents an embedding dimension.

After linearizing spatiotemporal information (STI), the formulas (6) and (7) are obtained as follows:

$$AF_{RC}(s(t))=Y^t \quad (6)$$

$$F_{RC}(s(t))=BY^t \quad (7)$$

where AB=I, a dimension of A is L×D, and a dimension of B is D×L.

The weight matrixes A and B are continuously updated through the calculation of the objective function, the final prediction result is obtained by the formula (6) after reaching a certain threshold.

Figure 1:
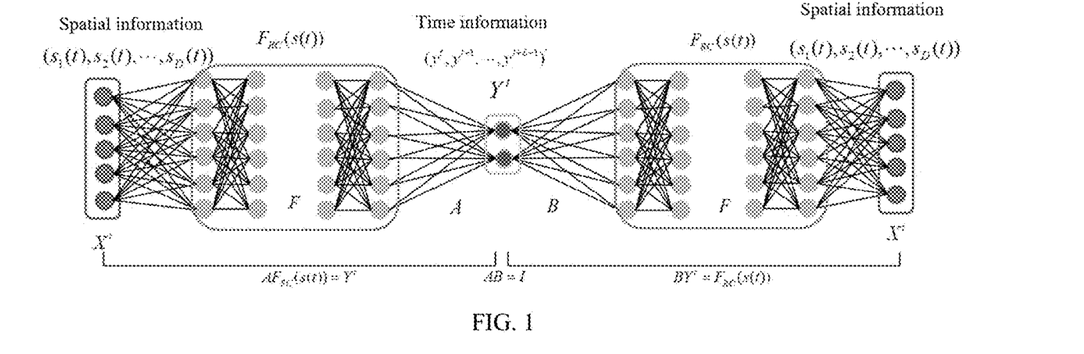
FIG. 1 illustrates a schematic diagram of a reservoir computing network architecture in embodiment 1 of the disclosure.

In summary, an architecture of the reservoir computing used in the method of the embodiment is shown in FIG. 1.

An observation vector s(t) inputted at a time point t is projected onto a randomly generated high-dimensional subspace V(S) through the reservoir, where V represents the high-dimensional subspace and S represents input time vectors. A predicted target is represented by a low-dimensional subspace as follows:

$$V'(\tilde{y})=\{y_{h+1}, y_{h+2}, \ldots, y_{h+L-1}\}$$

where V' represents the low-dimensional subspace, y represents the predicted target, h represents a length of the observed data in a temporal dimension, where h<T, $y=\{y_{h+1}, y_{h+2}, \ldots, y_{h+L-1}\}$ represents target information, and Y is a matrix form of the target information y, including a real target information $\{y_1, y_2, \ldots, y_h\}$ and the target information to be predicted $\{y_{h+1}, y_{h+2}, \ldots, y_{h+L-1}\}$, and Y is expressed as follows:

$$Y = \begin{Bmatrix} y_1, y_2, \ldots, y_h \\ y_2, y_3, \ldots, y_{h+1} \\ \vdots \quad \vdots \\ y_L, y_{L+1}, \ldots, y_{h+L-1} \end{Bmatrix}$$

The reservoir includes hidden layers, and a number of the hidden layers is N. h numbers of N-dimensional observation vectors are sequentially input into the hidden layers ($RC_1$, $RC_2$, ... $RC_n$) of the reservoir to compute, and the h numbers of N-dimensional observation vectors are expressed as a matrix as follows:

$$S \Rightarrow \begin{Bmatrix} s_1 \\ s_2 \\ \vdots \\ s_N \end{Bmatrix} \Rightarrow \begin{Bmatrix} s_1^1, s_1^2, \ldots, s_1^h \\ s_2^1, s_2^2, \ldots, s_2^h \\ \vdots \quad \vdots \\ s_N^1, s_N^2, \ldots, s_N^h \end{Bmatrix}$$

Numbers of neurons in the hidden layers of the reservoir are $(U_{r1}, U_{r2}, \ldots, U_{rN})$, a weight matrix of each hidden layer is randomly generated and is expressed as W, and $Ur_l$ represents the number of neurons in a l-th hidden layer of the reservoir. $s(t) \in \mathbb{R}^N$ is input into a first hidden layer of the reservoir, thereby obtaining an input weight matrix of the first hidden layer as $W_{In} \in \mathbb{R}^{N_{r1} \times N}$, and obtaining a weight matrix of the l-th hidden layer of the reservoir as $W_{res_l} \in \mathbb{R}^{N_{rl} \times N_{r(l-1)}}$. The weight matrix of each hidden layer in the reservoir is expressed as follows:

$$RC_1$$
$$\begin{bmatrix} r_1^1, r_1^2, \ldots, r_1^n \\ r_2^1, r_2^2, \ldots, r_2^n \\ \vdots \\ r_{U_{r1}}^1, r_{U_{r1}}^2, \ldots, r_{U_{r1}}^n \end{bmatrix}$$

$$RC_2 \qquad RC_N$$
$$\begin{bmatrix} r_1^1, r_1^2, \ldots, r_1^{U_{r1}} \\ r_2^1, r_2^2, \ldots, r_2^{U_{r1}} \\ \vdots \\ r_{U_{r2}}^1, r_{U_{r2}}^2, \ldots, r_{U_{r2}}^{U_{r1}} \end{bmatrix} \ldots \begin{bmatrix} r_1^1, r_1^2, \ldots, r_1^{U_{rN-1}} \\ r_2^1, r_2^2, \ldots, r_2^{U_{rN-1}} \\ \vdots \\ r_{U_{rN}}^1, r_{U_{rN}}^2, \ldots, r_{U_{rN}}^{U_{rN-1}} \end{bmatrix}$$

A leak rate of $W_{res_l}$ is set to 1%-5%. $W_{res_l}$ and $W_{In}$ are fixed values in the reservoir. The first layer of the reservoir is taken as an examplet a column from the h-dimensional column vectors of the decomposed input matrix is fed into $RC_1$ to obtain an input for $RC_2$. The computing is shown in the following formula:

$$\begin{bmatrix} s_1^1 \\ s_1^2 \\ \vdots \\ s_n^1 \end{bmatrix} \Rightarrow \begin{bmatrix} r_1^1, r_1^2, \ldots, r_1^n \\ r_2^1, r_2^2, \ldots, r_2^n \\ \vdots \\ r_{U_{r1}}^1, r_{U_{r1}}^2, \ldots, r_{U_{r1}}^n \end{bmatrix} = \begin{bmatrix} r(t_1)_1 \\ r(t_1)_2 \\ \vdots \\ r(t_1)_{U_{r1}} \end{bmatrix}$$

$$\begin{bmatrix} r(t_1)_1 \\ r(t_1)_2 \\ \vdots \\ r(t_1)_{U_{r1}} \end{bmatrix} = \begin{bmatrix} s_1^1 \cdot r_1^1 + s_2^1 \cdot r_1^2 + \ldots + s_n^1 \cdot r_1^n \\ s_1^1 \cdot r_1^1 + s_2^1 \cdot r_2^2 + \ldots + s_n^1 \cdot r_2^n \\ \vdots \\ s_1^1 \cdot r_{U_{r1}}^1 + s_2^1 \cdot r_{U_{r1}}^2 + \ldots + s_n^1 \cdot r_{U_{r1}}^n \end{bmatrix}$$

For the reservoir to operate stably a spectral radius of the connection weight matrix must satisfy the condition of being close to but less than 1. To achieve a stable state of the reservoir, updates are made using the following formula (8):

$$J_{ij} = \frac{\rho(J_{ij}^0) J_{ij}^0}{|\lambda_{max}(J_{ij}^0)|} \qquad (8)$$

where $J_{ij}$ represents a connection weight matrix between neurons within the reservoir, $\rho(J_{ij}^0)$ represents the spectral radius of a randomly generated connection matrix $J_{ij}^0$, and $\lambda_{max}$ represents a largest eigenvalue of $J_{ij}^0$.

The input scaling factor affects the linearity level of response of the reservoir, it enables the transformation of the input signal to the range where the neuron activation function operates. This value is adjusted through experimentation.

After passing through the reservoir, the observation vector s(t) is projected from an N-dimensional space onto a D-dimensional space. The weight matrix $B \in \mathbb{R}^{D \times L}$ is initialized as a zero matrix, and then fitting of training data is performed by using a formula (7) of $F_{RC}(s(t)) = BY$ as follows:

$$[y_1, \ldots, y_h] \Rightarrow \begin{bmatrix} y_1, y_2, \ldots, y_L \\ y_2, y_3, \ldots, y_{L+1} \\ \vdots \\ y_{h-L}, \ldots, y_h \end{bmatrix}$$

$$\begin{bmatrix} y_1, y_2, \ldots, y_L \\ y_2, y_3, \ldots, y_{L+1} \\ \vdots \\ y_{h-L}, \ldots, y_h \end{bmatrix} \begin{bmatrix} B_{i,1} \\ B_{i,2} \\ \vdots \\ B_{i,L} \end{bmatrix} = \begin{bmatrix} r_1^i \\ r_2^i \\ \vdots \\ r_{h-L}^i \end{bmatrix}$$

where i=1, . . . , D.

Ultimately, the weight matrix B is formed by vertically concatenating a transpose of $$\begin{bmatrix} B_{i,1} \\ B_{i,2} \\ \vdots \\ B_{i,L} \end{bmatrix}$$

The weights are linearly updated row by row during each iteration as follows:

$$B_{i,j} = \frac{1}{\text{item}} \sum_{\zeta=1}^{item} w_\zeta B_{i,j} \qquad (9)$$

where item represents a number of iterations, and w represents a weight coefficient at each iteration. An objective function is a root mean square error function (10) as follows:

$$\min R\ MSE = \sqrt{\sum_{i=1}^{L} \frac{(\hat{y}_i - y_i)^2}{L}} \qquad (10)$$

where $\hat{y}_i$ represents a predicted value and $y_i$ represents a real value.

The final prediction result is calculated by the formula (6). The multi-step output y(h+L−1) is directly predicted based on the inputs s(1), . . . , s(h), the multi-step prediction method reduces the error accumulation in each iteration process compared to a single-step iterative prediction method, making it more reliable than the one-step prediction.

Embodiment 2

Figure 2:
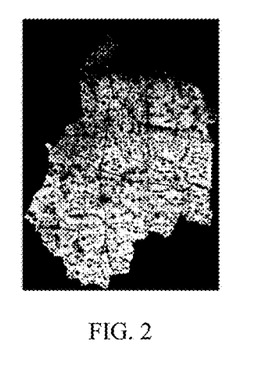
FIG. 2 illustrates a transformed difference vegetation index (TDVI) of a dataset in embodiment 2 of the disclosure.

FIG. 2 shows a distribution of the TDVI index in Xiangcheng City, Zhoukou, Henan Province, China (1987).

The dataset comes from the Landsat 5, Landsat 7, and Landsat 8 satellite imagery data of the United States geological survey (USGS), collected from Xiangcheng, Zhoukou, Henan, with geographical coordinates ranging from 114° 21' to 115° 40' East longitude and 33° 03' to 33° 30' North latitude. Remote sensing data from the end of April each year are selected, as this season coincides with the vigorous growth period of rice, which can better reflect the condition of crop vegetation. Three indices are chosen: TDVI[18], enhanced vegetation index (EVI), and normalized difference vegetation index (NDVI). These indices are primarily used for vegetation analysis, with calculation formulas (11) to (13) as follows:

$$TDVI = 1.5 \times \frac{(NIR - RED)}{\sqrt{NIR^2 + RED + 0.5}} \tag{11}$$

$$EVI = 2.5 \times \frac{NIR - RED}{NIR + {}^{6\times}RED - 7.5^{\times}BLUE + 1} \tag{12}$$

$$NDVI = \frac{NIR - RED}{NIR + RED} \tag{13}$$

where NIR represents a reflectance of a near-infrared band, RED represents a reflectance of a red band, and BLUE represents a reflectance of a blue band. The dataset utilizes TDVI, EVI, and NDVI data from 2000 observation points spanning the years 1987 to 2021, with each observation point having 35 temporal data points.

Figure 3A:
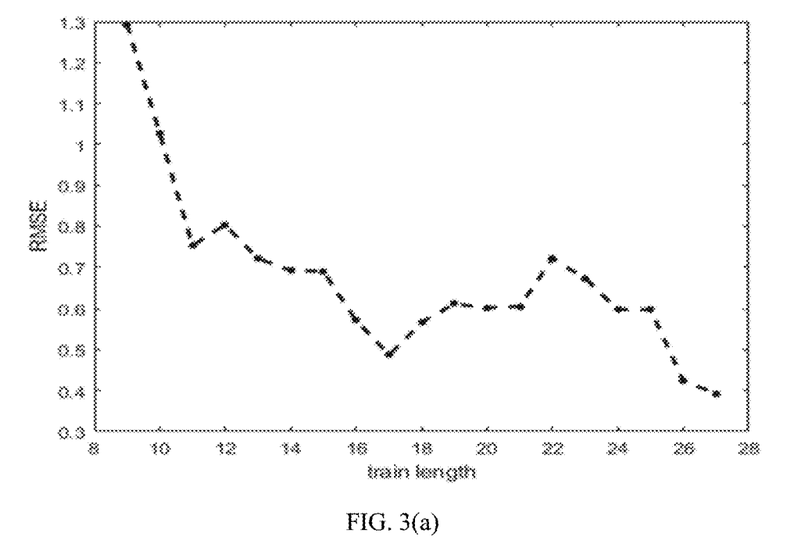
FIG. 3(a) illustrates a schematic diagram of parameter settings and root mean square error (RMSE) changes in the embodiment 2 of the disclosure.
Figure 3B:
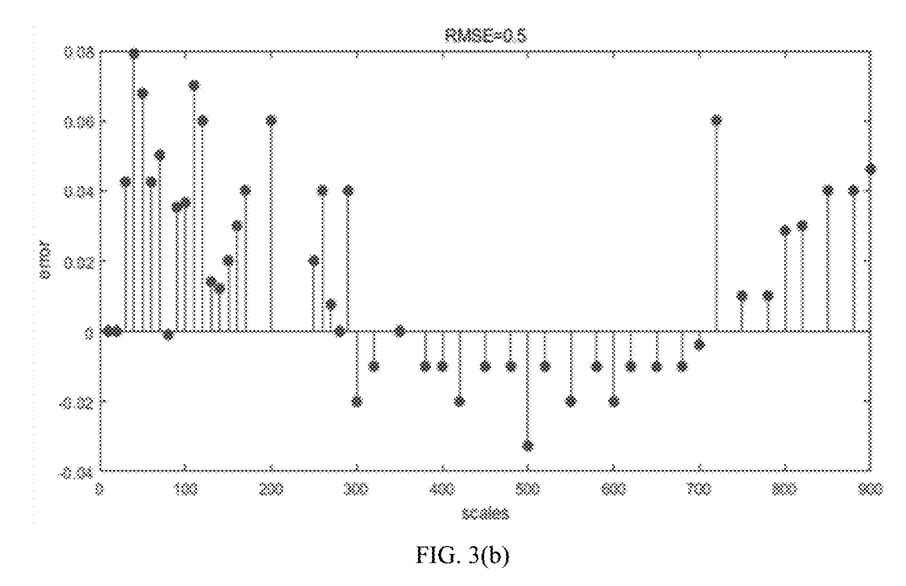
FIG. 3(b) illustrates a relationship between a RC network scale factor and RMSE when time series length is 25.

In the embodiment, the time series data of 10 observation points are sampled for the prediction of NDVI. The RMSE values predicted from a time series length of 9 to 27 are plotted, with a horizontal axis representing the length of the time series and a vertical axis representing the average RMSE values corresponding to the 10 observation points, as shown in FIG. 3(a). It can be observed from the curve chart that the longer the time series, the higher the accuracy of the predicted RMSE. The Ladset data has not been publicly available for long, and only 35 years of data have been collected. Therefore, the training length of the selected time series data is set to 25, which belongs to short-term prediction of time series data. FIG. 3(b) illustrates a relationship between the RC network scale factor and RMSE when the time series length is 25. Thus, a scale factor range of [300, 700] is more appropriate.

Figure 4A:
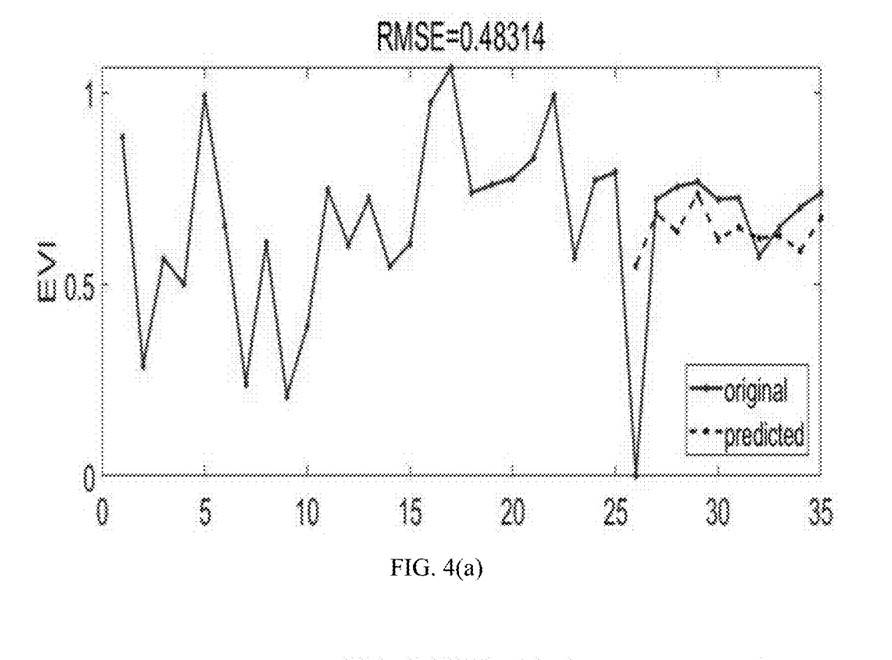
FIG. 4(a) illustrates a prediction result using the reservoir computing network described in the embodiment 1 of the disclosure.
Figure 4B:
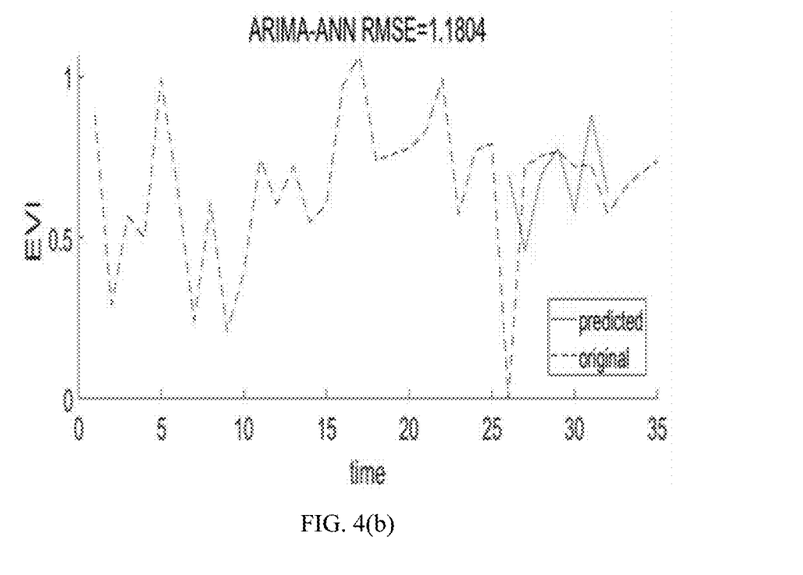
FIG. 4(b) illustrates a prediction result of an ARIMA-ANN model of the disclosure.
Figure 4C:
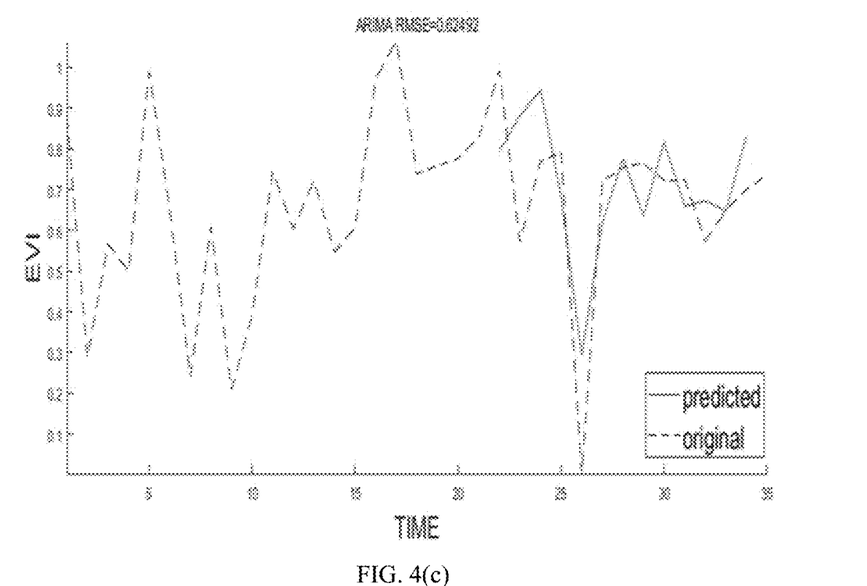
FIG. 4(c) illustrates a prediction result of an ARIMA model of the disclosure.
Figure 4D:
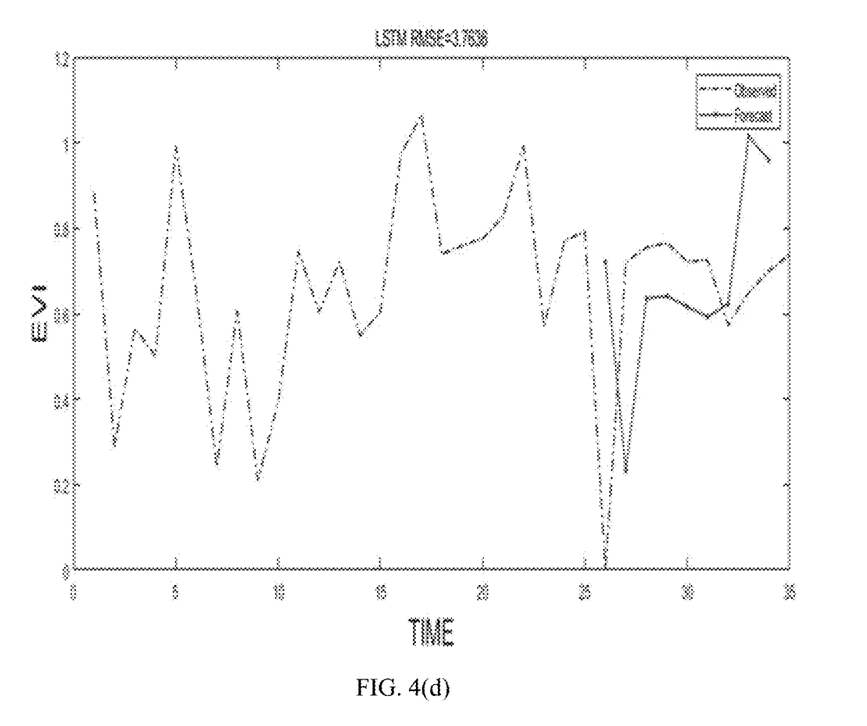
FIG. 4(d) illustrates a prediction result of a LSTM model of the disclosure.
Figure 4E:
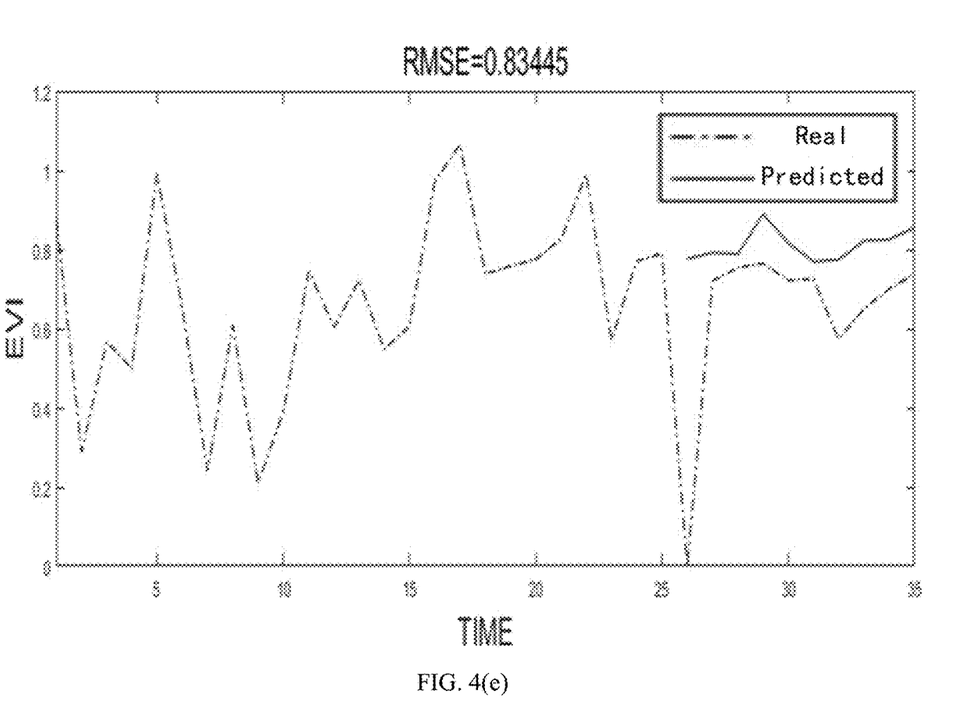
FIG. 4(e) illustrates a prediction result of an ESN model of the disclosure.

Based on the parameter settings obtained from the experimental observations, the reservoir computing network described in embodiment 1 is implemented to predict the three indices TDVI, EVI, and NDVI in the dataset. The RMSE metric indicates that the method of embodiment 1 achieves the expected results. FIGS. 4(a)-4(e) show predictions of the EVI at different time points for a randomly selected observation point. FIG. 4(a) illustrates a prediction result using the reservoir computing network described in the embodiment 1, FIG. 4(b) illustrates a prediction result of the ARIMA-ANN model, FIG. 4(c) illustrates a prediction result of the ARIMA model, FIG. 4(d) illustrates a prediction result of the LSTM model, and FIG. 4(e) illustrates a prediction result of the ESN model. To illustrate the predictive performance of different models on the TDVI, EVI, and NDVI, a randomly selected observation point is used, and Table 1 lists the R2, MAP, MAPE, and RMSE results of different models. This indicates that the method described in the embodiment 1 is suitable for short-term data, and approximately 25 measurement data points can reconstruct the dynamics of the system.

TABLE 1

| Model | NDVI | | | | EVI | | | | TDVI | | | |
|---|---|---|---|---|---|---|---|---|---|---|---|---|
| | R2 | MAE | MAPE | RMSE | R2 | MAE | MAPE | RMSE | R2 | MAE | MAPE | RMSE |
| ARIMA-ANN | 0.02 | 0.14 | 0.1 | 0.92 | −0.63 | 0.23 | 0.18 | 1.18 | −1.76 | 19.79 | 0.09 | 1.37 |
| ARIMA | 0.26 | 0.09 | 0.17 | 0.85 | 0.6 | 0.12 | 168.34 | 0.62 | 0.99 | 9.71 | 21.84 | 0.08 |
| LSTM | −1.51 | 0.14 | 0.16 | 1.49 | −15.19 | 0.18 | 0.24 | 3.76 | −1.47 | 14.13 | 61.1 | 1.48 |
| ESN | 0.03 | 0.01 | 0.12 | 0.96 | 0.28 | 0.01 | 0.63 | 0.83 | −1.22 | 0.28 | 1.36 | 1.41 |
| Embodiment 1 | 0.71 | 0.35 | 0.85 | 0.41 | 0.63 | 0.08 | 0.11 | 0.48 | 0.01 | 0.03 | 0.26 | 0.21 |

REFERENCE

[1] Wu H, Prasad S. Convolutional recurrent neural networks for hyperspectral data classification[J]. Remote Sensing. 2017, 9(3):298-318.
[2] Ullah F, Naeem M, Naeem H, et al. CroLSSim: Cross-language software similarity detector using a hybrid approach of LSA-based AST-MDrep features and CNN-LSTM model[J]. International Journal of Intelligent Systems. 2022, 37:5768-5795.
[3] Wang L, Zou H, Su J, et al. An ARIMA-ARR hybrid model for time series forecasting[J]. Systems Research and Behavioral Science. 2013, 30: 244-259.
[4] Chattopadhyay S, Chattopadhyay G. Univariate modeling of summer-monsoon rainfall time series: Comparison between ARIMA and ARNN[J]. Comptes Rendus Geoscience. 2010, 342: 100-107.
[5] Faruk D. A hybrid neural network and ARIMA model for water quality time series prediction[J]. Engineering Applications of Artificial Intelligence. 2010, 23(4):586-594.
[6] Nakajima K. Reservoir computing: Theory, physical implementations, and applications[M]. Singap: Springer Nature Singapore Pte Ltd, 2021.
[7] Tanaka G, Yamane T, Heroux J B, et al. Recent advances in physical reservoir computing: A review[J]. Neural Networks. 2019, 115: 100-123.
[8] Ma H, Leng S, Aihara K, et al. Randomly distributed embedding making short-term high-dimensional data predictable[J]. Proceedings of the National Academy of Sciences of the United States of America. 2018, 115(43): E9994-E10002.
[9] Chen P, Liu R, Aihara K, Chen L. Autoreservoir computing for multistep ahead prediction based on the spatiotemporal information transformation[J]. Nature Communications. 2020, 11(1):4568-4573.
[10] Bianchi F, Scardapane S, Lokse S, Jenssen R. Reservoir computing approaches for representation and classification of multivariate time series[J]. IEEE Transactions on Neural Networks and Learnings Systems. 2021, 32(5): 2169-2179.
[11] Real E, Aggarwal A, Huang Y, et al. Regularized evolution for image classifier architecture search[C]. AAAI Conference on Artificial Intelligence, Hawaii, USA: ACM, 2019: 4780-4789.
[12] Lukosevicius M, Jaeger H. Reservoir computing approaches to recurrent neural network training[J]. Computer Science Review, 2009, 3(3): 127-149.

[13] Deyle E R, Sugihara G. Generalized theorems for nonlinear state space reconstruction[J]. Plos One. 2011, 6(3):e18295.
[14] Takens F. Detecting strange attractors in turbulence[C]. Lecture Notes in Mathematics, Coventry, England: Springer, 1981: 366-381.
[15] Zhang Shu-Qing, Jia Jian, Gao Min, Han Xu. Study on the parameters determination for reconstructing phase-space in chaos time series [J]. Acta Phys. Sin., 2010, 59(3): 1576-1582.
[16] Wang Anliang, Yang Chunxin. Grassberger-Procaccia algorithm for evaluating the fractal characteristic of strange attractors [J]. Acta Phys. Sin., 2002, 51(12): 2719-2729.
[17] Han Min, Shi Zhiwei, Guo Wei. Reservoir state space reconstruction and prediction of chaotic time series [J]. Acta Phys. Sin., 2007, 56(1): 43-50.
[18] Abderrazar B, Asalhi H, Teillet P. Transformed difference vegetation index (TDVI) for vegetation cover mapping[C]. Geoscience and Remoted Sensing Symposium. Toronto, ON, Canada: IEEE, 2002:24-28.

For those skilled in the art, various corresponding changes and modifications can be proposed based on the above technical solutions and concepts, and all of these changes and modifications should be included within the scope of protection of the disclosure.

What is claimed is:

1. A method for predicting remote sensing image time series based on reservoir computing, the method being executed by a computer and comprising:
a reservoir computing network, wherein the reservoir computing network comprises an input layer, a reservoir, and an output layer;
projecting an observation vector s(t) inputted at a time point t onto a randomly generated high-dimensional subspace V(S) through the reservoir, where V represents the high-dimensional subspace and S represents input time vectors; wherein a predicted target is represented by a low-dimensional subspace as follows:

$$V(\tilde{y}) = \{y_{h+1}, y_{h+2}, \ldots, y_{h+L-1}\}$$

where V' represents the low-dimensional subspace, $\tilde{y}$ represents the predicted target, h represents a length of observational data in a temporal dimension, $y=\{y_1, y_2, \ldots, y_{h+L-1}\}$ represents target information, Y is a matrix form of the target information y, including real target information $\{y_1, y_2, \ldots, y_h\}$ and target information to be predicted $\{y_{h+1}, y_{h+2}, \ldots, y_{h+L-1}\}$, and Y is expressed as follows:

$$Y = \begin{Bmatrix} y_1, y_2, \ldots, y_h \\ y_2, y_3, \ldots, y_{h+1} \\ \vdots & \vdots \\ y_L, y_{L+1}, \ldots, y_{h+L-1} \end{Bmatrix}$$

wherein the reservoir comprises hidden layers, and a number of the hidden layers is N;
sequentially inputting h numbers of N-dimensional observation vectors into the hidden layers ($RC_1$, $RC_2$, . . . $RC_n$) of the reservoir to compute, wherein the h numbers of N-dimensional observation vectors are expressed as a matrix as follows:

$$S \Rightarrow \begin{Bmatrix} S_1 \\ S_2 \\ \vdots \\ S_N \end{Bmatrix} \Rightarrow \begin{Bmatrix} S_1^1, S_1^2, \ldots, S_1^h \\ S_2^1, S_2^2, \ldots, S_2^h \\ \vdots & \vdots \\ S_N^1, S_N^2, \ldots, S_N^h \end{Bmatrix}$$

wherein numbers of neurons in the hidden layers of the reservoir are ($N_{r1}$, $N_{r2}$, . . . , $N_{rN}$), a weight matrix of each hidden layer is randomly generated and is expressed as W, and $N_{rl}$ represents the number of neurons in a l-th hidden layer of the reservoir;
inputting $s(t) \in \mathbb{R}^N$ into a first hidden layer of the reservoir, thereby obtaining an input weight matrix of the first hidden layer as $W_{In} \in \mathbb{R}^{N_{r1} \times N}$, and obtaining a weight matrix of the l-th hidden layer of the reservoir as $W_{res_l} \in \mathbb{R}^{N_{rl} \times N_{r(l-1)}}$, wherein $W_{res_l}$ and $W_{In}$ are fixed values in the reservoir, and the weight matrix of each hidden layer in the reservoir is expressed as follows:

$$RC_1$$
$$\begin{bmatrix} r_1^1, r_1^2, \ldots, r_1^n \\ r_2^1, r_2^2, \ldots, r_2^n \\ \vdots \\ r_{U_{r1}}^1, r_{U_{r1}}^2, \ldots, r_{U_{r1}}^n \end{bmatrix}$$

$$RC_2 \qquad\qquad\qquad RC_N$$
$$\begin{bmatrix} r_1^1, r_1^2, \ldots, r_1^{U_{r1}} \\ r_2^1, r_2^2, \ldots, r_2^{U_{r1}} \\ \vdots \\ r_{U_{r2}}^1, r_{U_{r2}}^2, \ldots, r_{U_{r2}}^{U_{r1}} \end{bmatrix} \ldots \begin{bmatrix} r_1^1, r_1^2, \ldots, r_1^{U_{rN-1}} \\ r_2^1, r_2^2, \ldots, r_2^{U_{rN-1}} \\ \vdots \\ r_{U_{rN}}^1, r_{U_{rN}}^2, \ldots, r_{U_{rN}}^{U_{rN-1}} \end{bmatrix}$$

evolving the observation vector s(t) varying over time on an m-dimensional manifold M according to a dynamics $F_S(s(t))$, where $M \subset \mathbb{R}^m$, $F_S: M \to \mathbb{R}^m$ represents a smooth vector field;
wherein an observation function is defined as $v: M \to \mathbb{R}$, representing a discrete observation sequence v[s(t)], where t=0, 1, 2, . . . , T represents sampling instances, a propagation mapping function $\phi: M \to M$ represents a flow of s(t) at the time point t, and $s(t) = \phi(s(t))$;
wherein according to Takens theorem, there is a mapping $\Phi_{\phi,v,2m+1}(s(t)) = (v(s(t)), v(\phi(s(t))), \ldots, v(\phi^{2m}(s(t))))$, where 2m+1 represents a length of time delay embedding $\Phi_{\phi,v,2m+1}(s(t))$; for a pair ($\phi$,v) defined on the m-dimensional manifold M, where $v: M \to \mathbb{R}$ and $\phi: M \to M$, there is a one-to-one correspondence from M to $\Phi_{\phi,v,2m+1}(s(t))$, that is, $\Psi_{\phi,v,2m+1} = \Phi_{\phi,v,2m+1} \circ \phi \circ \Phi_{\phi,v,2m+1}$, where $\circ$ represents a function composition operation, and the formula describes a dynamical system under low-dimensional delayed coordinates that is identical to $\phi$;
performing a one-step prediction of a delayed attractor by using a non-delayed attractor, when delayed observation values $v(s(t))$, $v(\phi(s(t)))$, . . . , $v(\phi^{2m}(s(t)))$ are provided, using $\Psi_{\phi,v,2m+1}$ to predict a new value: $\Phi_{\phi,v,2m+1}(v(s(t)), v(\phi(s(t))), \ldots, v(\phi^{2m}(s(t)))) = (v(\phi(s(t))), \ldots, v(\phi^{2m}(s(t))), v(\phi^{2m+1}(s(t))))$;
wherein an output of the hidden layers of the reservoir is denotated as $F_{RC}(s(t))$, the mapping $\Phi_{\phi,v,2m+1}$ is denotated as $\Phi$, according to an embedding theorem, $\Phi(F_{RC}(s(t)))$ represents as an output sequence $Y^t$, $Y^t$ represents temporal information of a target variable; since the embedding is a one-to-one mapping, a conjugate form of $\Phi$ is $\Psi_{\phi,v,2m+1}$, abbreviated as $\Psi$, hence $F_{RC}(s(t))=\Psi(Y^t)$, $\Phi: \mathbb{R}^D \to \mathbb{R}^L$, $\Psi: \mathbb{R}^L \to \mathbb{R}^D$, where L represents an embedding dimension;

after linearizing spatiotemporal information (STI), obtaining:

$$AF_{RC}(s(t))=Y^t \quad (6)$$

$$F_{RC}(s(t))=BY^t \quad (7)$$

where AB=I, a dimension of A is L×D, and a dimension of B is D×L;

after passing through the reservoir, projecting the observation vector s(t) from an N-dimensional space onto a D-dimensional space;

initializing a weight matrix $B \in \mathbb{R}^{D \times L}$ as a zero matrix, and then performing fitting of training data by using a formula of $F_{RC}(s(t))=BY^t$ as follows:

$$[y_1, \ldots, y_h] \Rightarrow \begin{bmatrix} y_1, y_2, \ldots, y_L \\ y_2, y_3, \ldots, y_{L+1} \\ \vdots \\ y_{h-L}, \ldots, y_h \end{bmatrix}$$

$$\begin{bmatrix} y_1, y_2, \ldots, y_L \\ y_2, y_3, \ldots, y_{L+1} \\ \vdots \\ y_{h-L}, \ldots, y_h \end{bmatrix} \begin{bmatrix} B_{i,1} \\ B_{i,2} \\ \vdots \\ B_{i,L} \end{bmatrix} = \begin{bmatrix} r_1^i \\ r_2^i \\ \vdots \\ r_{h-L}^i \end{bmatrix}$$

where i=1, ..., D;

ultimately, forming the weight matrix B by vertically concatenating a transpose of $$\begin{bmatrix} B_{i,1} \\ B_{i,2} \\ \vdots \\ B_{i,L} \end{bmatrix};$$

wherein the weights are linearly updated row by row during each iteration as follows:

$$B_{i,j} = \frac{1}{\text{item}} \sum_{\zeta=1}^{\text{item}} w_\zeta B_{i,j}$$

where item represents a number of iterations, and $w_\zeta$ represents a weight coefficient at each iteration; an objective function is a root mean square error function as follows:

$$\min R\, MSE = \sqrt{\sum_{i=1}^{L} \frac{(\hat{y}_i - y_i)^2}{L}}$$

where $\hat{y}_i$ represents a predicted value and $y_i$ represents a real value;

calculating a final prediction result by the following formula: $AF_{RC}(s(t))=Y^t$;

wherein the method further comprises:
performing feature processing of remote sensing images based on the final prediction result to integrate multi-source data, wherein the multi-source data is used for crop yield prediction and forest cover change monitoring in agriculture and forestry, or for tracking pollution sources and assessing ecosystem health.

2. The method for predicting remote sensing image time series based on reservoir computing as claimed in claim 1, wherein a leak rate of $W_{res_i}$ is set to 1%-5%.

3. The method for predicting remote sensing image time series based on reservoir computing as claimed in claim 1, further comprising:
letting $J_{ij}$ represent a connection weight matrix between neurons within the reservoir; setting a spectral radius of the connection weight matrix to meet a condition of being close to but less than 1, thereby making the reservoir to operate stably; and using the following formula for updates in order to achieve a stable state of the reservoir:

$$J_{ij} = \frac{\rho(J_{ij}^0) J_{ij}^0}{|\lambda_{max}(J_{ij}^0)|}$$

where $\rho(J_{ij}^0)$ represents a spectral radius of a randomly generated connection matrix $J_{ij}^0$, and $\lambda_{max}$ represents a largest eigenvalue of $J_{ij}^0$.

4. The method for predicting remote sensing image time series based on reservoir computing as claimed in claim 1, wherein the multi-source data comprises weather, topography, and soil information.

\* \* \* \* \*